United States Patent
Sanz

(10) Patent No.: US 10,611,874 B2
(45) Date of Patent: Apr. 7, 2020

(54) XDI-TERMINATED POLYURETHANE, AND COMPOSITION COMPRISING SAID POLYURETHANE

(71) Applicant: BOSTIK SA, La Plaine Saint Denis (FR)

(72) Inventor: Federico Sanz, Choisy au Bac (FR)

(73) Assignee: BOSTIK SA, La Plaine Saint Denis (FR)

( * ) Notice: Subject to any disclaimer, the term of this patent is extended or adjusted under 35 U.S.C. 154(b) by 98 days.

(21) Appl. No.: 16/064,904

(22) PCT Filed: Dec. 20, 2016

(86) PCT No.: PCT/FR2016/053573
§ 371 (c)(1),
(2) Date: Jun. 21, 2018

(87) PCT Pub. No.: WO2017/109382
PCT Pub. Date: Jun. 29, 2017

(65) Prior Publication Data
US 2019/0002624 A1    Jan. 3, 2019

(30) Foreign Application Priority Data
Dec. 21, 2015  (FR) ..................... 15 62991

(51) Int. Cl.
| | | |
|---|---|---|
| *C08G 18/76* | (2006.01) | |
| *C08G 18/48* | (2006.01) | |
| *C08L 75/08* | (2006.01) | |
| *C08G 18/72* | (2006.01) | |
| *C08G 18/12* | (2006.01) | |
| *C09J 175/04* | (2006.01) | |

(52) U.S. Cl.
CPC ......... *C08G 18/7642* (2013.01); *C08G 18/12* (2013.01); *C08G 18/4812* (2013.01); *C08G 18/4825* (2013.01); *C08G 18/4829* (2013.01); *C08G 18/721* (2013.01); *C08G 18/7664* (2013.01); *C08G 18/7671* (2013.01); *C08L 75/08* (2013.01); *C09J 175/04* (2013.01); *C08G 2170/00* (2013.01)

(58) Field of Classification Search
CPC ................ C08G 18/12; C08G 18/4812; C08G 18/4825; C08G 18/4829; C08G 18/721; C08G 18/7642; C08G 18/7664; C08G 18/7671; C08G 2170/00; C08L 75/08; C09J 175/04
See application file for complete search history.

(56) References Cited

U.S. PATENT DOCUMENTS

| | | |
|---|---|---|
| 7,166,666 B2 | 1/2007 | Ooba et al. |
| 2006/0167167 A1 | 7/2006 | Ooba et al. |
| 2015/0344614 A1 | 12/2015 | Federico |

FOREIGN PATENT DOCUMENTS

| | | | |
|---|---|---|---|
| EP | 1524296 A1 | 4/2005 | |
| EP | 2949676 A1 | 12/2015 | |
| JP | H101607 A | 1/1998 | |
| WO | WO-2012087897 A1 * | 6/2012 | ............. C08G 18/10 |

OTHER PUBLICATIONS

International Search Report for PCT/FR2016/053573 dated Apr. 19, 2017.
English Abstract of JPH101607, Publication Date: Jan. 6, 1998.

* cited by examiner

*Primary Examiner* — Christopher M Rodd
(74) *Attorney, Agent, or Firm* — Millen, White, Zelano and Branigan, P.C.

(57) ABSTRACT

The present invention relates to a novel XDI-terminated polyurethane. The present invention also relates to the use of said polyurethane for manufacturing an adhesive, mastic and/or surface coating composition, especially for the construction field, which is stable over time in terms of viscosity.

15 Claims, No Drawings

XDI-TERMINATED POLYURETHANE, AND COMPOSITION COMPRISING SAID POLYURETHANE

FIELD OF THE INVENTION

The present invention relates to a novel reactive polyurethane prepolymer, the isocyanate (NCO) end groups of which are derived from the reaction between meta-xylylene diisocyanate (XDI) and a polyurethane prepolymer with hydroxyl (OH) end groups.

The present invention also relates to the use of said polyurethane for manufacturing an adhesive, mastic and/or surface coating composition, in particular for the construction field, which is stable over time in terms of viscosity.

The present invention also relates to an adhesive, mastic and/or surface coating composition comprising the polyurethane prepolymer according to the invention.

TECHNOLOGICAL BACKGROUND

To meet the need of the majority, it is sought to develop surface coating, mastic and adhesive compositions that can be used or applied at low temperature (between 5° C. and 35° C.) and especially at room temperature (23° C.).

Many surface coating, mastic and adhesive compositions available on the market are manufactured from reactive polyurethanes based on MDI (methylene diphenyl diisocyanate), especially having isocyanate end groups that crosslink in the presence of moisture.

However, these compositions generally have the drawback of comprising sizeable residual contents of MDI originating from the polyurethane synthesis reaction, which are liable to lead to a certain number of drawbacks, especially toxicity problems.

NCO-terminated MDI-based polyurethanes are conventionally prepared by reacting a polyol with a stoichiometric excess of MDI. This stoichiometric excess may be expressed by an NCO/OH molar ratio (denoted "NCO/OH ratio") of strictly greater than 1, which corresponds to the molar ratio of the number of isocyanate (NCO) groups to the number of hydroxyl (OH) groups borne by the reactive species bearing such functions, used in the preparation of the polyurethane. Said stoichiometric excess is necessary for obtaining isocyanate end groups on the polyurethane. Depending on the chosen NCO/OH molar ratio, the polyurethane synthesized is obtained with a greater or lesser excess of residual MDI monomer, corresponding to the MDI monomer that is unreacted at the end of the reaction.

In order to reduce the drawbacks associated with the presence of a high content of MDI, studies have been conducted to synthesize NCO-terminated MDI-based polyurethanes with a minimum amount of residual MDI monomer.

However, it has been observed that polyurethane compositions having an MDI monomer content of less than or equal to 1% by weight relative to the weight of the polyurethane composition are highly viscous at room temperature and have problems of stability over time in terms of viscosity.

Specifically, these polyurethane compositions with a low content of MDI monomer have a limited storage life and their viscosity rapidly increases over time, until they become too viscous to be able to be formulated in the form of a surface coating composition, an adhesive composition or a mastic composition, which can be used or applied at low temperature (5-35° C.) and especially at room temperature (23° C.).

It is known practice to use diluents such as hydrocarbon-based organic solvents or plasticizers to reduce the viscosity of NCO-terminated polyurethane compositions having a low content of residual diisocyanate monomer. However, these diluents have the drawback of having to be used in large amounts which is generally undesired. In addition, these diluents do not make it possible to efficiently stabilize the evolution of viscosity of such polyurethane compositions, especially in the long term.

Alternatively, it has been proposed in patent application WO 2011/051019 to add a $C_2$-$C_{24}$ monocarboxylic or dicarboxylic acid ester in order to reduce the viscosity of an NCO-terminated polyurethane composition having a low content of residual diisocyanate monomer. In the examples, it was demonstrated that by adding 5% to 6% by weight of a particular ester to an NCO-terminated polyurethane composition based on TDI (toluene diisocyanate) having a low content of residual TDI monomer, the viscosity of the composition no longer changed or changed very little over time after one week at 40° C.

However, the efficacy of this stabilization remains to be improved, especially in light of the amounts of stabilizer used and/or of the stabilization time.

Moreover, no stabilizing effect was demonstrated on NCO-terminated MDI-based polyurethanes having a low content of residual MDI monomer, since these compositions are generally more unstable in terms of viscosity than compositions based on NCO-terminated TDI-based polyurethane having a low content of residual TDI.

Thus, there is a need to provide an a polyurethane prepolymer that makes it possible to obtain a mastic composition having a low content of residual MDI-type monomer while maintaining a viscosity and mechanical properties that are satisfactory.

SUMMARY OF THE INVENTION

A first subject of the present invention relates to an XDI-terminated polyurethane based on methylene diphenyl diisocyanate or based on a mixture of meta-xylylene diisocyanate and methylene diphenyl diisocyanate, said polyurethane not being solid at a temperature ranging from 5° C. to 35° C., characterized in that the polyurethane is obtained using an XDI/(XDI+MDI) molar ratio ranging from 16% to 25% or strictly greater than 50%.

According to one embodiment of the invention, the XDI-terminated polyurethane is capable of being obtained by a polyaddition reaction of at least one polyol composition with at least one polyisocyanate composition, under anhydrous conditions, in amounts of polyisocyanate(s) and of polyol(s) leading to an NCO/OH molar ratio ranging from 1.6 to 2.5.

Preferably, the polyol composition is a mixture of polyether diol and of polyether triol.

According to one embodiment of the invention, the XDI-terminated polyurethane is based on methylene diphenyl diisocyanate and is meta-xylylene diisocyanate-terminated.

According to this embodiment, the XDI-terminated polyurethane is capable of being obtained:

by a first polyaddition reaction of at least one polyol composition with at least one methylene diphenyl diisocyanate composition, under anhydrous conditions, in amounts of polyisocyanate(s) and of polyol(s) leading to an NCO/OH molar ratio strictly less than 1 in order to obtain an OH-terminated polyurethane, followed by a second polyaddition reaction of the OH-terminated polyurethane with a meta-xylylene diisocyanate composition, under anhydrous conditions, in amounts of polyisocyanate(s) and of polyol(s) leading to an NCO/OH molar ratio ranging from 1.6 to 2.5.

According to one embodiment, the XDI-terminated polyurethane according to the invention is obtained using an XDI/(XDI+MDI) molar ratio ranging from 16% to 25% or 55% to 95%, preferably ranging from 16% to 25%.

A second subject of the present invention relates to a polyurethane composition comprising at least one polyurethane according to invention and at least some residual meta-xylylene diisocyanate monomers.

Another subject of the present invention relates to a process for preparing a polyurethane according to the invention or a polyurethane composition according to the invention, said process comprising the mixing of a polyisocyanate composition comprising meta-xylylene diisocyanate and methylene diphenyl diisocyanate with a polyol composition.

According to one embodiment, the mixing is carried out in two steps, the first step comprising a polyaddition reaction of at least one polyol composition with at least one methylene diphenyl diisocyanate composition, under anhydrous conditions, in amounts of polyisocyanate(s) and of polyol(s) leading to an NCO/OH molar ratio strictly less than 1 in order to obtain an OH-terminated polyurethane and the second step comprising a polyaddition reaction of said OH-terminated polyurethane with a meta-xylylene diisocyanate composition, under anhydrous conditions, in amounts of polyisocyanate(s) and of polyol(s) leading to an NCO/OH molar ratio ranging from 1.6 to 2.5.

The invention also relates to a composition comprising:
at least one polyurethane according to the invention or at least one polyurethane composition according to the invention,
at least one filler, and
at least one crosslinking catalyst.

According to one embodiment, the composition according to the invention comprises:
from 10% to 30% by weight of at least one polyurethane according to the invention or at least one polyurethane composition according to the invention,
from 25% to 70% by weight of at least one filler,
from 0.01% to 1% by weight of at least one crosslinking catalyst,
the percentages by weight being expressed relative to the total weight of said composition.

According to one embodiment of the invention, the composition comprises less than 0.1% by weight of residual methylene diphenyl diisocyanate monomers and less than 0.5% by weight of residual meta-xylylene diisocyanate monomers, the percentages by weight being expressed relative to the total weight of said composition.

According to one embodiment of the invention, the composition is in anhydrous form.

The present invention also relates to an article comprising the composition according to the invention in airtight hermetic packaging. Preferably, the hermetic packaging is an aluminum bag or an aluminum cartridge.

The present invention makes it possible to provide adhesive or mastic compositions that comply with current regulations. In particular, the content of residual MDI and of residual XDI in the adhesive or mastic compositions is below the regulatory limits that require products containing larger amounts of residual MDI and/or XDI monomers to be labeled.

The adhesive and/or mastic compositions according to the invention have properties very similar to the adhesive and/or mastic compositions comprising a polyurethane based on MDI alone.

Other subjects and features of the present invention will become more clearly apparent on reading the description and examples.

DETAILED DESCRIPTION OF THE EMBODIMENTS OF THE INVENTION

In the present application, unless otherwise indicated:
the viscosity is measured at room temperature (23° C.). The viscosity measurement at 23° C. may be carried out using a Brookfield viscometer according to the standard ISO 2555. Typically, the measurement performed at 23° C. may be carried out using a Brookfield RVT viscometer, a spindle suitable for the viscosity range and at a speed of rotation of 20 revolutions per minute (rpm);
the various embodiments of the compositions according to the invention, which are intended to be used as adhesive, mastic and/or surface coating compositions, described in the present application may be combined together, as long as the intended use is the same (adhesive, mastic or surface coating).

In what follows:
An MDI compound denotes a methylene diphenyl diisocyanate that can be represented by the following formula:

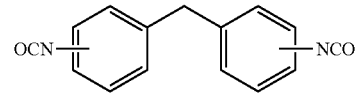

in which the NCO functions may be at various positions of the aromatic rings.

An XDI compound denotes a meta-xylylene diisocyanate that can be represented by the following formula:

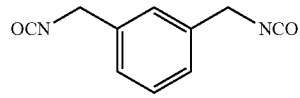

The present invention relates firstly to an XDI-terminated polyurethane based on methylene diphenyl diisocyanate (MDI) or based on a mixture of meta-xylylene diisocyanate (XDI) and methylene diphenyl diisocyanate (MDI), said polyurethane not being solid at a temperature ranging from 5° C. to 35° C.

The XDI-terminated polyurethane according to the invention is obtained from XDI and MDI such that the XDI/(XDI+MDI) molar ratio expressed as a percentage ranges from 16% to 25% or is strictly greater than 50%, preferably ranges from 16% to 25%. The XDI/(XDI+MDI) ratio is strictly less than 100% since the XDI-terminated polyurethane is obtained from XDI and MDI.

According to one embodiment of the invention, the XDI/(XDI+MDI) molar ratio expressed as a percentage ranges from 16% to 25% or from 55% to 95%, preferably from 16% to 25% or from 60% to 90%, more preferably from 16% to 25% or from 65% to 85%, or even from 16% to 25%.

Within the meaning of the present invention, an "XDI-terminated polyurethane" should be understood to mean a polyurethane having at the chain end, an NCO (isocyanate) function originating from the reaction between an XDI compound and a preformed polyurethane prepolymer having a OH (hydroxyl) functions at its ends. The OH-terminated preformed polyurethane will be denoted by the expression "precursor polyurethane". This isocyanate end group can be represented by the following formula:

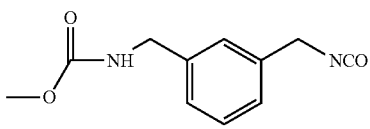

corresponding to the unit derived from the reaction between the OH function borne by the precursor polyurethane and one of the NCO functions borne by the XDI.

Within the meaning of the present invention, an "XDI-terminated polyurethane based on MDI or based on XDI or based on a mixture of MDI and XDI" should be understood to mean an XDI-terminated polyurethane as defined above and having MDI units or XDI units or both MDI and XDI units in the chain.

The XDI-terminated polyurethane according to the invention is not a hot-melt polyurethane, that is to say it is not solid at a temperature ranging from 5° C. to 35° C., and especially at room temperature (23° C.). In particular, it has a viscosity measured at 23° C. of less than or equal to 300 000 mPa·s, preferably less than or equal to 250 000 mPa·s, more preferentially ranging from 100 to 200 000 mPa·s, and better still ranging from 4000 to 150 000 mPa·s (millipascal·second). Such polyurethanes are sufficiently fluid at a temperature ranging 5° C. to 35° C. to be able to be processed easily in this temperature range using application and/or mixing devices customarily used in the field of adhesives, mastics and/or coatings, as illustrated in particular in the examples of the present application.

The XDI-terminated polyurethane according to the invention is capable of being obtained by at least one polyaddition reaction of at least one polyol composition with at least one polyisocyanate composition, under anhydrous conditions, with or without a reaction catalyst, in amounts of polyisocyanate(s) and of polyol(s) leading to an NCO/OH molar ratio, denoted by r1, ranging from 1.6 to 2.5.

The polyaddition reaction(s) may be carried out at a temperature below 95° C., preferably ranging from 65° C. to 90° C., more preferentially from 80° C. to 85° C.

The amounts by weight of the reactants to be charged into the reactor for synthesizing the XDI-terminated polyurethane according to the invention are determined on the basis of the ratio r1, and also, regarding the polyols, on the basis of their number-average molar mass (expressed in g/mol) and their hydroxyl functionality (IOH expressed in mg of KOH per gram), or regarding the polyisocyanates, on the basis of their content of isocyanate groups (% NCO expressed as percentage by weight relative to the weight of polyisocyanate).

The abovementioned polyisocyanate composition may consist of MDI alone or consist of XDI alone or consist of a mixture of MDI and XDI, or else the abovementioned MDI and/or XDI may be in a mixture with one or more polyisocyanate monomers different from MDI and XDI. These polyisocyanate monomers may be chosen from those customarily used in the synthesis of an NCO-terminated polyurethane, and more preferentially from toluene diisocyanate (TDI), isophorone diisocyanate (IPDI), hexamethylene diisocyanate (HDI).

The MDI used may be in the form of an isomer or mixture of isomers, such as 4,4'-MDI and/or 2,4'-MDI. Preferably, the MDI used consists of at least 90% by weight, and better still of at least 95% by weight of 4,4'-MDI isomer relative to the total weight of MDI.

According to one embodiment, the XDI-terminated polyurethane according to the invention is based on a mixture of XDI and MDI. In this case, the polyurethane is capable of being obtained from a polyisocyanate composition consisting of XDI and MDI, optionally as a mixture with one or more other polyisocyanate monomers different from MDI and XDI.

According to another embodiment, the XDI-terminated polyurethane according to the invention is based on MDI. In this case, the polyurethane is capable of being obtained by a one-step or two-step process.

In the case of a one-step process, the polyurethane is capable of being obtained from a polyisocyanate composition consisting of XDI and MDI, optionally as a mixture with one or more other polyisocyanate monomers different from MDI and XDI. Indeed, the MDI is much more reactive than the XDI, so that the MDI will react first with the polyol composition whereas the XDI will react last, after disappearance of the residual MDI monomers in order to obtain the XDI-terminated polyurethane according to the invention.

In the case of a two-step process, the polyurethane according to the invention is capable of being obtained by:
  a first polyaddition reaction of at least one polyol composition with at least one MDI composition, under anhydrous conditions, in amounts of polyisocyanate(s) and of polyol(s) leading to an NCO/OH molar ratio strictly less than 1 in order to obtain an OH-terminated polyurethane (precursor polyurethane)
  followed by a second polyaddition reaction of the OH-terminated polyurethane with an XDI composition, under anhydrous conditions, in amounts of polyisocyanate(s) and of polyol(s) leading to an NCO/OH molar ratio ranging from 1.6 to 2.5.

According to the latter embodiment, during the first step, the polyisocyanate composition preferably consists of one or more isomers of MDI and preferably of at least 90% by weight, and better still of at least 95% by weight of 4,4'-MDI relative to the weight of the polyisocyanate composition used in the first step.

According to the latter embodiment, during the second step, the XDI composition preferably consists of meta-XDI (referred to as XDI in the present invention) optionally in combination with ortho-XDI and/or para-XDI. Preferably, the XDI composition consists of at least 90% by weight, more preferably of at least 95% by weight and better still of at least 98% by weight of meta-XDI relative to the total weight of the XDI composition used in the second step.

The XDI-terminated polyurethane according to the invention is obtained from XDI and MDI such that the XDI/(XDI+MDI) molar ratio expressed as a percentage ranges from 16% to 25% or is strictly greater than 50%, preferably ranges from 16% to 25%. The XDI/(XDI+MDI) ratio is strictly less than 100% since the XDI-terminated polyurethane is obtained from XDI and MDI.

According to one embodiment of the invention, the XDI/(XDI+MDI) molar ratio expressed as a percentage ranges from 16% to 25% or from 55% to 95%, preferably from 16% to 25% or from 60% to 90%, more preferably from 16% to 25% or from 65% to 85%, or even from 16% to 25%.

This molar ratio is determined independently of the manufacturing process, whether it is a one-step process or a two-step process.

According to any one of the embodiments indicated above, the polyol composition may consist of a polyol or a mixture of polyols. In particular, the polyol(s) that can be used may be chosen from those having a number-average molar mass ranging from 1000 to 18 000 g/mol, and more particularly those having a number-average molar mass ranging from 1000 to 8000 g/mol.

The polyol composition preferably consists of one or more polyethers, and more preferentially of at least one polyether triol.

Better still, the polyol composition is a mixture of polyether diol and triol, such as polypropylene glycol triol and polypropylene glycol diol.

The polyisocyanate composition and the polyol composition used in the process for preparing the XDI-terminated polyurethane according to the invention are preferably chosen so as to obtain a non-hot-melt XDI-terminated polyurethane, especially having a viscosity as described above.

The reaction catalyst(s) that can be used may be any catalyst known to a person skilled in the art for catalyzing the formation of polyurethane by reaction of at least one polyisocyanate and at least one polyol.

The XDI-terminated polyurethane according to the invention may be in the form of a polyurethane composition, which may optionally contain a mixture of several XDI-terminated polyurethanes. In particular, said polyurethane composition may comprise residual MDI and/or XDI monomers that have not reacted.

The content of XDI-terminated polyurethane is preferably at least 95% by weight, more preferentially at least 97% by weight of the total weight of the polyurethane composition according to the invention.

The content of MDI monomer in the polyurethane composition according to the invention is preferably less than or equal to 0.8% by weight, and more preferentially less than or equal to 0.5% by weight of the total weight of the polyurethane composition according to the invention.

The content of XDI monomer in the polyurethane composition according to the invention is preferably less than or equal to 4.0% by weight, and more preferentially less than or equal to 2.5% by weight of the total weight of the polyurethane composition this according to the invention.

The principle of the analytical method for determining the concentration of residual diisocyanate (MDI or XDI) monomers is based on the specific reaction of the isocyanate group NCO with an amine (1-(2-methoxyphenyl)piperazine or PPZ) to form stable urea derivatives. These derivatives are obtained during the preparation of the sample to be analyzed by dilution/dissolution of this sample using an acetonitrile solution containing 0.02 mol/L of PPZ. The PPZ derivatives formed from the isocyanates contained in the sample to be analyzed are then assayed with a C18 reverse-phase high-performance liquid chromatography (HPLC) system with a gradient of mobile phase comprising a mixture of water and acetonitrile buffered with an aqueous solution of tetrabutylammonium disulfate at 0.2% by weight, at a pH ranging from 2 to 3, equipped with an ultraviolet (UV) detector functioning at 254 nm. These compounds are identified and quantified by comparing their retention time and their surface area of chromatographic peaks with those of the standard PPZ derivatives obtained by reaction of a diisocyanate (MDI or XDI) monomer of known nature and concentration.

The sample to be analyzed may be a polyurethane composition as described previously.

The sample to be analyzed may also be an adhesive, mastic and/or surface coating composition according to the invention formulated from said polyurethane composition.

The polyurethane according to the invention or the polyurethane composition according to the invention as described above may be used to manufacture an adhesive, mastic and/or surface coating composition, especially for the construction field.

Therefore, a subject of the present application is, secondly, a composition, which can be used as an adhesive, mastic and/or surface coating composition, comprising:
  at least one polyurethane according to the invention as described in any one of the preceding paragraphs,
  at least one filler,
  at least one crosslinking catalyst.

According to one embodiment of the invention, the adhesive, mastic and/or surface coating composition comprises:
  from 10% to 30% by weight, preferably from 15% to 20% by weight, of at least one polyurethane according to the invention as described in any one of the preceding paragraphs,
  from 25% to 70% by weight of at least one filler,
  from 0.01% to 1% by weight of at least one crosslinking catalyst,
the percentages by weight being expressed relative to the total weight of the adhesive, mastic and/or surface coating composition.

The adhesive, mastic and/or surface coating compositions according to the invention have the advantage of being stable in terms of viscosity over long periods of storage (at least 2-3 weeks, under anhydrous conditions at 20-40° C.) and are in fact easy to use. In particular, the adhesive, mastic and/or surface coating compositions according to the invention have excellent extrusion or coating properties at room temperature with the aid of conventional devices for mixing and/or applying coating compositions, adhesive compositions or mastic compositions. An example of such an application device is described in the examples of the present application.

In addition, the adhesive, mastic and/or surface coating compositions according to the invention especially have good mechanical properties (especially elasticity and modulus) suited to their respective use, as adhesive, surface coating or mastic. Advantageously, these properties are not degraded after storage.

Preferably, the choice of the contents of ingredients in the adhesive, mastic and/or surface coating composition according to the invention, and especially the content of polyurethane composition according to the invention, is such that said adhesive, mastic and/or surface coating composition comprises a content of MDI monomer of less than 0.1% by weight relative to the total weight of the adhesive, mastic and/or surface coating composition and an XDI content of less than 0.5% by weight relative to the total weight of the adhesive, mastic and/or surface coating composition.

By reducing the MDI content below this threshold, the adhesive, mastic and/or surface coating compositions according to the invention especially have toxicity risks that are reduced or negligible with respect to man and his environment.

The XDI content in the adhesive, mastic and/or surface coating composition according to the invention is such that said adhesive, mastic and/or surface coating composition has toxicity risks that are reduced or negligible with respect to man and his environment.

Thus, according to one preferred embodiment, the adhesive, mastic and/or surface coating composition may comprise for example:
- from 15% to 20% by weight relative to the total weight of the adhesive, mastic and/or surface coating composition, of the XDI-terminated polyurethane according to the invention,
- from 50% to 70% by weight of at least one filler, relative to the total weight of the adhesive, mastic and/or surface coating composition,
- from 0.01% to 1% by weight of at least one crosslinking catalyst, relative to the total weight of the adhesive, mastic and/or surface coating composition,
- from 5% to 25% by weight of at least one rheology agent, relative to the total weight of the adhesive, mastic and/or surface coating composition.

The adhesive, mastic and/or surface coating composition according to this preferred embodiment of the invention comprises less than 0.1% by weight of MDI and less than 0.5% by weight of XDI, relative to the total weight of said composition.

According to one embodiment, the adhesive, mastic and/or surface coating composition may comprise:
- from 15% to 20% by weight relative to the total weight of the adhesive, mastic and/or surface coating composition, of a polyurethane composition according to the invention comprising:
  a) at least 98% by weight relative to the weight of said polyurethane composition according to the invention, of at least one non-hot-melt XDI-terminated polyurethane, as described in any one of the preceding paragraphs,
  b) a content of MDI monomer of less than 0.5% by weight, relative to the weight of said polyurethane composition according to the invention,
  c) a content of XDI monomer of less than 2.5% by weight, relative to the weight of said polyurethane composition according to the invention,
- from 50% to 70% by weight of at least one filler, relative to the total weight of the adhesive, mastic and/or surface coating composition,
- from 0.01% to 1% by weight of at least one crosslinking catalyst, relative to the total weight of the adhesive, mastic and/or surface coating composition,
- from 5% to 25% by weight of at least one rheology agent, relative to the total weight of the adhesive, mastic and/or surface coating composition.

The adhesive, mastic and/or surface coating composition according to this more preferred embodiment of the invention comprises less than 0.1% by weight of MDI and less than 0.5% by weight of XDI, relative to the total weight of said composition.

As crosslinking catalyst(s) that may be used in the adhesive, mastic and/or surface coating composition according to the invention, use may be made of any catalyst(s) known to a person skilled in the art for catalyzing the crosslinking of the NCO-terminated polyurethane in the presence of water (or moisture). The water or moisture may be provided by the surface of the support or the surrounding medium, in a natural manner (atmospheric moisture) or controlled manner (for example in a thermostatic chamber at a relative humidity between 40% and 70% at 23° C., or an oven ranging up to 150° C.) on contact with the composition according to the invention. This crosslinking is expressed by the creation, between the polymer chains of the polyurethane, of urea-type bonds that lead to the formation of a three-dimensional polymer network.

Use may for example be made of one or more crosslinking catalysts chosen from dioctyltin dilaurate (DOTL), bismuth-based catalysts, or else tertiary amine catalysts such as:

1,8-diazabicyclo[5.4.0]undec-7-ene (DBU):

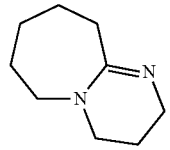

1,5-diazabicyclo[4.3.0]non-5-ene (DBN):

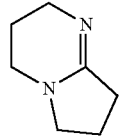

2,2-dimorpholinodiethyl ether (DMDEE):

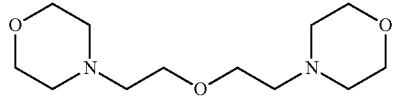

1,4-diazabicyclo[2.2.2]octane (DABCO):

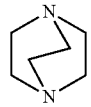

These crosslinking catalysts have the advantage of not being carcinogenic, mutagenic or reprotoxic (CMR).

Preferably, the amount of crosslinking catalyst that can be used ranges from 0.05% to 0.5% by weight relative to the weight of the adhesive, mastic and/or surface coating composition according to the invention.

The filler(s) that can be used in the adhesive, mastic and/or surface coating composition according to the invention may be chosen from mineral fillers and mixtures of organic fillers and mineral fillers.

As examples of mineral filler(s) that can be used, use may be made of any mineral filler(s) usually used in the field of surface coating, adhesive or mastic compositions. These fillers are in the form of particles of diverse geometry. They may be, for example, spherical, fibrous, or may have an irregular shape.

Preferably, use is made of clay, quartz or carbonate fillers.

More preferentially, use is made of carbonate fillers, such as alkali metal or alkaline-earth metal carbonates, and more preferentially calcium carbonate or chalk.

These fillers may optionally be treated, for example with an organic acid such as stearic acid or a mixture of organic acids consisting predominantly of stearic acid.

Use may also be made of hollow mineral micro spheres such as hollow glass microspheres, and more particularly those made of calcium sodium borosilicate or of aluminosilicate.

The amount of mineral filler that may be used may especially range from 20% to 65% by weight, preferably from 20% to 50% by weight and more preferentially from 25% to 40% by weight of the weight of the adhesive, mastic and/or surface coating composition according to the invention.

As examples of organic filler(s) that can be used, use may be made of any organic filler(s) and especially polymeric filler(s) usually used in the field of surface coating, adhesive or mastic compositions.

Use may be made, for example, of polyvinyl chloride (PVC), polyolefins, rubber, ethylene vinyl acetate (EVA), or aramid fibres such as Kevlar®.

Use may also be made of hollow microspheres made of expandable or non-expandable thermoplastic polymer. Mention may be made especially of hollow microspheres of vinylidene chloride/acrylonitrile.

PVC is preferably used.

The mean particle size of the filler(s) that can be used is preferably less than or equal to 10 microns, more preferentially less than or equal to 3 microns, so as to avoid their sedimentation in the adhesive, mastic and/or surface coating composition according to the invention during its storage.

The mean particle size is measured for a volume particle size distribution corresponding to 50% by volume of the sample of particles analyzed. When the particles are spherical, the mean particle size corresponds to the median diameter (D50 or Dv50) which corresponds to the diameter such that 50% of the particles by volume have a size smaller than said diameter. In the present patent application, this value is expressed in micrometers and determined according to standard NF ISO 13320-1 (1999) by laser scattering on a Malvern machine.

The adhesive, mastic and/or surface coating composition according to the invention may comprise at least one plasticizer in a proportion of from 5% to 20% by weight, preferably from 10% to 15% by weight, of the weight of the adhesive, mastic and/or surface coating composition according to the invention.

As examples of plasticizers that can be used, use may be made of any plasticizer usually used in the field of adhesive, mastic and/or surface coating compositions.

Use is preferably made of:
diisodecyl phthalate (DIDP)
an ester of an alkylsulfonic acid and of phenol, as sold under the name Mesamoll® by the company Lanxess
diisononyl 1,2-cyclohexanedicarboxylate, as sold under the name Hexamoll Dinch® by the company BASF.

The adhesive, mastic and/or surface coating composition according to the invention may comprise at least one rheology agent.

As examples of rheology agents that can be used, mention may be made of any rheology agent usually used in the field of adhesive, mastic and/or surface coating compositions.

Use is preferably made of one or more rheology agents chosen from thixotropic agents, and more preferentially from:
PVC plastisols, corresponding to a suspension of PVC in a plasticizer that is miscible with PVC, obtained in situ by heating to temperatures ranging from 60° C. to 80° C. These plastisols may be those described especially in the publication *Polyurethane Sealants*, Robert M. Evans, ISBN 087762-998-6,
fumed silica,
urea derivatives derived from the reaction of an aromatic diisocyanate monomer such as 4,4'-MDI with an aliphatic amine such as butylamine. The preparation of such urea derivatives is described especially in patent application FR 1 591 172.

The total content of rheology agent(s) that can be used may range from 1% to 40% by weight, preferably from 5% to 30% by weight, more preferentially from 10% to 25% by weight, of the weight of the adhesive, mastic and/or surface coating composition according to the invention.

Preferably, the adhesive, mastic and/or surface coating composition according to the invention does not comprise any hydrocarbon-based organic solvent, such as those with a boiling point below 250° C. at atmospheric pressure, such as xylene.

The composition according to the invention may comprise at least one adjuvant chosen from adhesion promoters such as epoxysilanes, UV stabilizers (or antioxidants), pigments, colorants, and a mixture thereof. When these adjuvants are present in the composition, the total sum of their content is preferably less than or equal to 15% by weight relative to the total weight of the adhesive, mastic and/or surface coating composition according to the invention.

When the composition according to the invention is intended to be used as an adhesive composition, it may comprise at least one tackifying resin.

As examples of tackifying resin(s) that can be used, mention may be made of any tackifying resin usually used in the field of adhesive compositions.

Preferably, use is made of those with a weight-average molar mass ($M_w$) ranging from 200 to 5000 g/mol and preferably chosen from:
(i) natural or chemically modified rosins, for instance rosin extracted from pine gum, wood rosin extracted from tree roots and hydrogenated, dimerized, polymerized derivatives thereof or derivatives esterified with monoalcohols or polyols such as glycerol, pentaerythritol or neopentyl glycol;
(ii) resins obtained by hydrogenation, polymerization or copolymerization (with an aromatic hydrocarbon) of mixtures of unsaturated aliphatic hydrocarbons containing approximately 5, 9 or 10 carbon atoms derived from petroleum fractions;
(iii) terpene resins generally resulting from the polymerization of terpene hydrocarbons, for instance monoterpene (or pinene) in the presence of Friedel-Crafts catalysts, which are optionally modified by the action of phenols;
(iv) copolymers based on natural terpenes, for example styrene/terpene, α-methylstyrene/terpene and vinyltoluene/terpene.

The tackifying resin is chosen so as to be compatible with the NCO-terminated polyurethane used according to the invention, i.e. so that when it is mixed in weight proportions of 10%/90% with said NCO-terminated polyurethane, this gives a substantially homogeneous mixture. In particular, the mixture remains transparent (in the visible light spectrum—wavelength ranging from 380 to 780 nanometers, measured in a vacuum) and no phase separation or total or partial gelation is observed in the polyurethane/resin mixture.

The total amount of tackifying resin(s) that may be used may range from 5% to 10% by weight of the weight of the adhesive composition.

Preferably, the adhesive composition according to the invention comprises:
from 15% to 30% by weight of an XDI-terminated polyurethane according to the invention as described in any of the preceding paragraphs,
from 40% to 65% by weight of at least one carbonate filler,
from 0.01% to 1% by weight of at least one crosslinking catalyst,
preferably less than 0.1% by weight of MDI monomer,
preferably less than 0.5% by weight of XDI monomer,
the percentages by weight being expressed relative to the weight of the adhesive composition.

When the composition according to the invention is intended to be used as a mastic composition, it preferably comprises:
- from 20% to 30% by weight of an XDI-terminated polyurethane according to the invention as described in any of the preceding paragraphs,
- from 20% to 25% by weight of at least one carbonate filler,
- from 10% to 20% by weight, preferably from 15% to 20% by weight, of at least one organic filler and/or at least one rheology agent,
- from 0.01% to 1% by weight of at least one crosslinking catalyst,
- preferably less than 0.1% by weight of MDI monomer,
- preferably less than 0.5% by weight of XDI monomer, the percentages by weight being expressed relative to the weight of the mastic composition.

When the composition according to the invention is intended to be used as a surface coating composition, it preferably comprises:
- from 20% to 25% by weight of an XDI-terminated polyurethane according to the invention as described previously,
- from 25% to 50% by weight of at least one carbonate filler,
- from 0.01% to 1% by weight of at least one crosslinking catalyst,
- preferably less than 0.1% by weight of MDI monomer,
- preferably less than 0.5% by weight of XDI monomer, the percentages by weight being expressed relative to the total weight of the surface coating composition.

The adhesive, mastic or surface coating compositions according to the invention are formulated so as to be able to be used or applied at low temperature (between 5° C. and 35° C.) and especially at room temperature (23° C.).

Preferably, the adhesive, mastic or surface coating compositions are in anhydrous form.

A subject of the present invention is, thirdly, a process for preparing a composition according to the invention which is stable over time in terms of viscosity, comprising a step in which the ingredient(s) optionally present in the composition according to the invention is (are) mixed with an XDI-terminated non-hot-melt polyurethane composition at a temperature below or equal to 50° C., preferably ranging from 5° C. to 45° C., and better still ranging from 20° C. to 30° C.

The addition and mixing of the ingredients are carried out under anhydrous conditions.

The adhesive, mastic or surface coating composition according to the invention is preferably stored in an anhydrous environment, for example in hermetic packaging where the adhesive, mastic or surface coating composition is protected from moisture and preferably is protected from light.

The present invention also relates to an article or packaging, that is ready to use, comprising the adhesive, mastic or surface coating composition according to the invention in hermetic packaging that is protected from air, in particular that is protected from ambient moisture. Preferably, the hermetic packaging also makes it possible to protect the composition from light. For example, the hermetic packaging may be an aluminum bag or an aluminum cartridge.

The adhesive, mastic or surface coating composition may be used in a process comprising:
a) applying said composition to a surface, and
b) moistening said applied composition.

Alternatively, the adhesive, mastic or surface coating composition may be used in a process comprising:
a) moistening the surface, and
b) applying said composition to said moistened surface.

In the case of a mastic composition, the surface may be a concrete surface or a metal surface. Examples of surfaces are indicated in the standard ISO 11600 (2002).

The following examples are given purely by way of illustration of the invention and cannot be interpreted as limiting the scope thereof.

EXAMPLES

Preparation of the Polyurethanes

The polyurethanes of examples 1 to 5 according to the invention and of comparative examples A to D and of example 6 outside of the invention were prepared by mixing the ingredients indicated in tables 1 and 1a at a temperature below or equal to 95° C. under anhydrous conditions. The amounts indicated in tables 1 and 1a are expressed as a percentage by weight relative to the total weight of the polyurethane composition of each of the examples.

When the polyurethane comprises both MDI units and XDI units, the process is sequential, that is to say that the MDI and the polyols were introduced in a first step in order to form an OH-terminated polyurethane, then in a second step the XDI was introduced in order to form the NCO-terminated polyurethane (terminated by an XDI unit).

TABLE 1

| | comparative polyurethanes | | | |
|---|---|---|---|---|
| | A | B | C | D |
| PPG triol having a number-average molar mass of 4000 g/mol | 42 | 42.2 | 42.3 | 41 |
| PPG diol having a number-average molar mass of 2000 g/mol | 27.5 | 27.7 | 27.7 | 27 |
| 4.4'-MDI (% NCO = 33.6% by weight) | 14 | 11.9 | 10.68 | 11 |
| XDI (% NCO = 44.7% by weight) | 0 | 1.57 | 2.56 | 4.5 |
| Catalyst (DOTL) | 0.0006 | 0.006 | 0.006 | 0.006 |
| Xylene | 16.5 | 16.6 | 16.6 | 16.6 |
| NCO/OH molar ratio | 1.9 | 1.9 | 1.9 | 2.0 |
| % by weight of final NCO | 2.1 | 2.1 | 2.2 | 3.0 |
| XDI/(XDI + MDI) molar ratio in % | 0 | 15.9 | 25.6 | 37.0 |
| Viscosity | 25000 | gel | gel | gel |

TABLE 1a

| | polyurethanes 1 to 5 according to the invention and polyurethane 6 outside of the invention | | | | | |
|---|---|---|---|---|---|---|
| | 1 | 2 | 3 | 4 | 5 | 6 |
| PPG triol having a number-average molar mass of 4000 g/mol | 41.8 | 41.7 | 41.4 | 41.9 | 42.5 | 42.5 |

TABLE 1a-continued polyurethanes 1 to 5 according to the invention and polyurethane 6 outside of the invention

|  | 1 | 2 | 3 | 4 | 5 | 6 |
|---|---|---|---|---|---|---|
| PPG diol having a number-average molar mass of 2000 g/mol | 27.4 | 27.4 | 27.2 | 27.5 | 27.9 | 27.9 |
| 4.4'-MDI (% NCO = 33.6% by weight) | 12.66 | 12.2 | 12.55 | 7.6 | 4.29 | 0 |
| XDI (% NCO = 44.7% by weight) | 1.70 | 2.1 | 2.51 | 6.35 | 8.6 | 12.87 |
| Catalyst (DOTL) | 0.0006 | 0.0006 | 0.006 | 0.006 | 0.0006 | 0.0006 |
| Xylene | 16.6 | 16.6 | 16.6 | 16.6 | 16.7 | 16.7 |
| NCO/OH molar ratio | 1.9 | 2.0 | 2.0 | 2.1 | 2.0 | 2.1 |
| % by weight of final NCO | 2.4 | 2.5 | 2.6 | 2.7 | 2.66 | 2.98 |
| XDI/(XDI + MDI) molar ratio in % | 16.1 | 19.8 | 22.3 | 54.6 | 74.2 | 100 |
| Viscosity (D + 5) | 56000 | 48000 | 50000 | 4960 | 40000 | 1600 |

In table 1 above:

The % by weight of final NCO corresponds to the amount of NCO functions in the polyurethane at the end of the polyurethane preparation reaction, expressed relative to the total weight of polyurethane.

The viscosity of the polyurethane composition is measured 5 days after the end of the reaction (D+5) at 23° C. under anhydrous storage conditions. The viscosity measurement is carried out at 23° C. using a Brookfield RVT viscometer, with a number 6 spindle at a speed of rotation of 20 revolutions per minute (rpm). The value measured is expressed in millipascal-seconds (mPa·s).

The polyurethanes A and 1 to 6 were characterized before being formulated in mastic compositions:

The viscosity of the polyurethane composition is measured 1 day after the end of the reaction V(D+1) then 7 days after the end of the reaction V(D+7) at 23° C. under anhydrous storage conditions. The viscosity measurement is carried out at 23° C. using a Brookfield RVT viscometer, with a number 6 spindle at a speed of rotation of 20 revolutions per minute (rpm). The value measured is expressed in millipascal-seconds (mPa·s).

The modulus at 100% is measured according to the standard ISO 11600 (referring especially to the standard ISO 8339).

The elongation at break is measured according to the standard NF ISO 37 (March 2012), The modulus of rupture is measured according to the standard ISO 11600 (referring especially to the standard ISO 8339).

The results of the characterization are indicated in table 2 below.

TABLE 2 characterization of the polyurethanes

|  | A | 1 | 2 | 3 | 4 | 5 | 6 |
|---|---|---|---|---|---|---|---|
| V(D + 1) | 8000 |  |  | 51000 | 3500 | 37000 | 1400 |
| V(D + 7) | 20000 | 30000 | 48000 | 59000 | 4960 | 40000 | 1600 |
| Modulus at 100% (MPa) | 1020 | 1110 | 1150 | 1250 | 1190 | 2170 | 2470 |
| Elongation at break (%) | 310 | 290 | 310 | 354 | 340 | 320 | 276 |
| Modulus of rupture (MPa) | 1890 | 1950 | 2100 | 2760 | 2430 | 3760 | 3870 |

Other tests were carried out: the polyurethanes 1a and 3a were prepared from the same ingredients as the polyurethanes 1 and 3 respectively, but with a one-step process, that is to say that the 4,4'-MDI and the XDI are introduced simultaneously with the polyols.

The polyurethanes 1a and 3a were also characterized. The results are presented in table 2a below.

TABLE 2a characterization of the polyurethanes 1a and 3a

|  | 1a | 3a |
|---|---|---|
| V(D + 1) |  |  |
| V(D + 7) | 30000 | 50000 |
| Modulus at 100% | 1110 | 1200 |
| Elongation at break | 290 | 340 |
| Modulus of rupture | 1950 | 2600 |
| % by weight of final NCO | 2.1 | 2.6 |

It was moreover observed that the content of residual MDI and XDI monomers of the compositions of polyurethanes 1a and 3a is close to the content of residual MDI and XDI monomers of the compositions of polyurethanes 1 and 3 respectively.

Preparation of the Mastic Compositions

Since the comparative examples B to D formed a gel, they were not able to be formulated into mastic compositions.

Mastic compositions were then formulated from the polyurethanes A and 1 to 6 that were prepared in accordance with the process above.

The mastic compositions were obtained by mixing the following ingredients:

20% by weight of the previously prepared polyurethane, 15.5% by weight of the plasticizer, 30% by weight of filler(s), 12% by weight of urea gel, 4.5% by weight of solvent, 16% by weight of PVC, 2% by weight of other additives.

The mastic compositions formulated from each polyurethane were characterized as reported in table 3.

TABLE 3 characterization of the mastic compositions

|  | A | 1 | 2 | 3 | 4 | 5 | 6 |
|---|---|---|---|---|---|---|---|
| Skinning time (min) | 70 | 80 | 90 | 106 | 300 | 220 | 360 |
| Extrusion (g/min) | 163 | 210 | 236 | 273 | 845 | 125 | 1500 |
| Cure 24 h (mm) | 4 | 4 | 4 | 3 | 3 | 3 | 3 |
| Dumbbell Modulus at 100% (kPa) | 460 | 500 | 540 | 560 | 430 | 740 | 666 |
| Dumbbell Elongation at break (%) | 946 | 846 | 811 | 818 | 774 | 718 | 710 |
| % free MDI | 0.2 | 0.05 | 0.05 | 0.07 | <0.01 | <0.01 | <0.01 |
| % free XDI |  | 0.10 | 0.12 | 0.16 | 0.29 | 0.30 | 0.36 |

Characterization:
The skinning time was measured according to the standard ISO 291 at 23° C. and 50% relative humidity.
The extrusion corresponds to the amount of mastic in grams that was able to be extruded per minute, under a piston pressure of 3 bar, at 23° C.
The cure 24 h was measured according to the standard ISO 291.
The dumbbell modulus at 100% was measured according to the standard NF ISO 37 (March 2012) with dumbbell test specimens.
The dumbbell elongation at break was measured according to the standard ISO 37 (March 2012) with dumbbell test specimens.
The % free MDI corresponds to the amount of residual MDI monomers in the mastic composition expressed as a weight percentage relative to the weight of the mastic composition.
The % free XDI corresponds to the amount of residual XDI monomers in the mastic composition expressed as a weight percentage relative to the weight of the mastic composition.

For compositions 4, 5 and 6, it is observed that the amount of residual MDI monomers is below the detection limit of the apparatus (0.01%).

The comparative composition A comprises a polyurethane based on MDI alone and it is noted that the amount of residual MDI monomers is 0.2%, which is above the regulatory limit that requires products to be labeled.

The compositions 1 to 5 according to invention have satisfactory properties for the targeted applications and furthermore they have residual MDI and XDI contents below the regulatory limits imposed for the labeling of the products.

Moreover, it is noted that the compositions 1 to 3 have the closest properties to the properties of the comparative composition A.

An XDI-terminated polyurethane based on XDI (composition 6) has a limited industrial advantage since the cost of XDI is high.

Of course, the present invention is not limited to the examples and embodiments described and represented, but can be varied in numerous ways which are achievable by a person skilled in the art.

The invention claimed is:

1. An XDI-terminated polyurethane based on methylene diphenyl diisocyanate or based on a mixture of meta-xylylene diisocyanate and methylene diphenyl diisocyanate, said polyurethane not being solid at a temperature ranging from 5° C. to 35° C., characterized in that the polyurethane is obtained using an XDI/(XDI+MDI) molar ratio ranging from 16% to 25% or strictly greater than 50%.

2. The polyurethane as claimed in claim 1, capable of being obtained by a polyaddition reaction of at least one polyol composition with at least one polyisocyanate composition, under anhydrous conditions, in amounts of polyisocyanate(s) and of polyol(s) leading to an NCO/OH molar ratio ranging from 1.6 to 2.5.

3. The polyurethane as claimed in claim 2, characterized in that the polyol composition is a mixture of polyether diol and of polyether triol.

4. The polyurethane as claimed in claim 1, characterized in that it is based on methylene diphenyl diisocyanate and is meta-xylylene diisocyanate-terminated.

5. The polyurethane as claimed in claim 4, capable of being obtained:
    by a first polyaddition reaction of at least one polyol composition with at least one methylene diphenyl diisocyanate composition, under anhydrous conditions, in amounts of polyisocyanate(s) and of polyol(s) leading to an NCO/OH molar ratio strictly less than 1 in order to obtain an OH-terminated polyurethane,
    followed by a second polyaddition reaction of the OH-terminated polyurethane with a meta-xylylene diisocyanate composition, under anhydrous conditions, in amounts of polyisocyanate(s) and of polyol(s) leading to an NCO/OH molar ratio ranging from 1.6 to 2.5.

6. The polyurethane as claimed in claim 1, obtained using an XDI/(XDI+MDI) molar ratio ranging from 16% to 25% or 55% to 95%, preferably ranging from 16% to 25%.

7. A polyurethane composition comprising at least one polyurethane as claimed in claim 1 and at least some residual meta-xylylene diisocyanate monomers.

8. A process for preparing a polyurethane as claimed in claim 1, said process comprising the mixing of a polyisocyanate composition comprising meta-xylylene diisocyanate and methylene diphenyl diisocyanate with a polyol composition.

9. The process as claimed in claim 8, wherein the mixing is carried out in two steps, the first step comprising a polyaddition reaction of at least one polyol composition with at least one methylene diphenyl diisocyanate composition, under anhydrous conditions, in amounts of polyisocyanate(s) and of polyol(s) leading to an NCO/OH molar ratio strictly less than 1 in order to obtain an OH-terminated polyurethane and the second step comprising a polyaddition reaction of said OH-terminated polyurethane with a meta-xylylene diisocyanate composition, under anhydrous conditions, in amounts of polyisocyanate(s) and of polyol(s) leading to an NCO/OH molar ratio ranging from 1.6 to 2.5.

10. A composition comprising:
at least one polyurethane as claimed in claim 1,
at least one filler, and
at least one crosslinking catalyst.

11. The composition as claimed in claim 10, comprising:
from 10% to 30% by weight of at least one polyurethane as claimed in claim 1,
from 25% to 70% by weight of at least one filler,
from 0.01% to 1% by weight of at least one crosslinking catalyst,
the percentages by weight being expressed relative to the total weight of said composition.

12. The composition as claimed in claim 10, comprising less than 0.1% by weight of residual methylene diphenyl diisocyanate monomers and less than 0.5% by weight of residual meta-xylylene diisocyanate monomers, the percentages by weight being expressed relative to the total weight of said composition.

13. The composition as claimed in claim 10, which is in anhydrous form.

14. An article comprising the composition as claimed in claim 10 in airtight hermetic packaging.

15. The article as claimed in claim 14, wherein the hermetic packaging is an aluminum bag or an aluminum cartridge.

* * * * *